Patented Dec. 9, 1941

2,265,917

UNITED STATES PATENT OFFICE 2,265,917

MANUFACTURE OF CELLULOSE DERIVATIVES

Leon Lilienfeld, Vienna, Austria; Antonie Lilienfeld, administratrix of said Leon Lilienfeld, deceased, assignor to Lilienfeld Patents Inc., Boston, Mass., a corporation of Massachusetts No Drawing. Application March 27, 1936, Serial No. 71,260. In Great Britain March 29, 1935

7 Claims. (Cl. 260—226)

Ethyl derivatives of cellulose which are soluble in caustic alkali solution, but which are insoluble or only scarcely soluble in water and processes for making same are described for the first time in my specifications Patent Nos. 1,589,606, 1,683,831 and 1,683,682.

The chief processes described in those specifications consist either in treating alkali cellulose with diethyl sulphate at a temperature of 40 to 60° C. (see for instance Example V of my specification Patent No. 1,589,606) or with ethyl chloride at a temperature of 70 to 120° C.

According to the working formulae used for their preparation, inter alia according to the degree of maturing given the alkali cellulose and/or the time of the reaction and/or the time allowed the reaction mass to stand until the reaction mass is worked up and/or to the temperature at which the reaction is conducted and/or to the proportions of the ethylating agents used for ethylation in my aforesaid processes cellulose derivatives form which either (a) completely dissolve in caustic alkali solution at room temperature, or (b) only incompletely dissolve therein, or (c) do not dissolve at all (or do not dissolve to any substantial extent) in caustic alkali solution at room temperature.

Among the members of Group b the proportion of the part which will dissolve in caustic alkali solution at room temperature to the part which will not dissolve in caustic alkali solution at room temperature varies in my aforementioned processes within very wide limits, for instance between 40 to 90 per cent. of the part that will dissolve to 60–10 per cent of the part that will not dissolve (see for example the relative examples of my U. S. Patents 1,683,831 and 1,683,682) and in many instances even between 10 to 20 per cent. of the part that will dissolve to 90–80 per cent. of the part that will not dissolve.

The members of Group b may therefore, by digesting them in caustic alkali solution at room temperature and filtration, straining, centrifuging or the like, be separated into their constituents which will dissolve in caustic alkali solution at room temperature and their constituents which will not dissolve in caustic alkali solution at room temperature, or they may be brought completely into solution in caustic alkali solution according to the process laid down in my British specification 212,864, i. e. by contacting them with caustic alkali solution and cooling the thus obtained mixture to a temperature between plus 5° C. and minus 10° or lower and thereafter bringing the solution back to room temperature. (See for instance page 3, lines 62 to 71 of my British specification 212,864, where the making of solutions of alkali-soluble cellulose ethers for example alkyl derivatives of cellulose by refrigeration is described for the first time.)

The process of my British specification 212,864 can also be used for dissolving many of the members of Group c in caustic alkali solution.

The products of the processes described in the specifications set forth in the first paragraph of this specification are also soluble in the known solvents for cellulose, such as strong organic bases in presence or absence of caustic alkali (see my U. S. Patent 1,771,460), or ammonia derivatives of carbon dioxide or of sulphurated carbon dioxide in presence of caustic alkali (see my U. S. Patent 1,771,461), or cuprammonium solution, or zinc chloride solution, or calciumthiocyanate solution or the like.

Now, in continuing my researches on my alkali-soluble, water-insoluble alkyl-derivatives of cellulose, I have discovered that technically valuable ethyl-derivatives of cellulose are obtained when the reaction between cellulose and ethyl chloride in the presence of alkali is conducted at a temperature below 70° C., for example at a temperature between 50 to 65° C. and, when the ethylation is conducted in presence of not substantially less than 11.5 mols. of water per 1 mol. of caustic alkali preferably NaOH at a temperatube below 80° C., for example at a temperature of 60 to 75° C.

The technical advance marked by the invention consists further in the feature that the ethyl derivatives of cellulose prepared thereby can be worked up into shaped structures (such as film, threads, coatings of all kinds, etc.) which excel by a pliability and/or flexibility, and tensile strength particularly in the moist state which considerably surpass the pliability and/or flexibility and particularly the wet tenacity of such cellulose ethers as ceteris paribus are produced at 70° C. or at a higher temperature.

It is a characteristic feature and a considerable advantage of the present invention that, when the ethylation is conducted at a temperature below 60° C., for example at 50 to 55° C., regardless of the proportions of ethyl chloride used, i. e. even if large excesses of ethyl chloride are employed, in many cases ethyl derivatives of cellulose form which do not contain substantially more than 1 ethyl group per 20 $C_6H_{10}O_5$ molecular units of cellulose and in some cases not more than 1 ethyl group per 30 to 40 $C_6H_{10}O_5$ molecular units of cellulose.

This fact is surprising for two reasons:

(1) Because, up to the present, no alkyl derivatives of cellulose are known which contain such small proportions of introduced alkyl groups, and (2) Because it is amazing that so small proportions of introduced ethyl groups are capable of making cellulose soluble in alkali and convertible into useful shaped structures.

But, ethyl derivatives of cellulose containing so small proportions of ethyl groups are interesting not only as chemical curiosities. For they are very valuable basic materials for the manufacture of shaped structures which, with regard to their physical properties, such as their tensile strength, particularly in the wet state, surpass ethyl celluloses which are made by treating alkali cellulose with ethyl chloride under the same working conditions, but with the exception that the reaction is conducted in presence of substantially less than 11.5 mols. of water per one mol. of caustic alkali preferably NaOH at a temperature substantially above 70° C. or in presence of substantially more than 11.5 mols. of water per one mol. of caustic alkali preferably NaOH at a temperature above 80° C.

A further advantage of the present process consists in the circumstance that the pressure developed during the practical working of the process is distinctly lower than the pressure that is necessary for working at temperatures substantially exceeding 70° C. or 80° C.

The cellulose derivatives prepared according to the invention are suitable for the production of certain derivatives thereof, such as esters and xanthates and the like. The cellulose derivatives made according to the present invention are further useful parent materials for the manufacture of water-soluble cellulose ethers or of such cellulose ethers as are soluble in organic solvents.

The ethyl derivatives of cellulose produced according to the invention have the same or similar solubility relationships as the alkali-soluble ethyl derivatives of cellulose which are made according to the processes described in my specifications set forth in the first paragraph of the present specification. In other words: Most of them are at least partially soluble in caustic alkali solution, but insoluble or only scarcely soluble in water. Like the cellulose derivatives manufactured according to the processes of the aforementioned specifications they either (a) dissolve substantially completely in caustic alkali solution at room temperature, or (b) dissolve incompletely therein, or (c) do not dissolve at all (or to any substantial extent) in caustic alkali solution at room temperature. The members of Group b and the members of Group c can be brought into solution in caustic alkali solution at room temperature according to the process laid down in my British Specification 212,864, i. e. by cooling their suspensions or incomplete solutions in caustic alkali solution to a temperature between plus 5° C. and minus 25° C. and then raising the temperature to room temperature.

Since certain members of Groups b and c will dissolve completely in caustic alkali solution at temperatures around 0° C. (for example at 0° C. to plus 5° C.) and, in general, remain dissolved therein when the solutions are allowed to come back to room temperature, whilst other members of these two groups can be made to dissolve substantially or completely therein at room temperature only by cooling their suspensions or incomplete solutions in caustic alkali solution to a temperature below 0° C., for example to minus 1 to minus 10° C. or lower, the temperatures used for causing the members of Groups b and c (or their constituents which will not dissolve at room temperature), to dissolve in caustic alkali solution, vary within wide limits.

As a matter of course, if desired, also the members of Group a can be dissolved with the aid of cooling to a temperature coming within the scope of the temperatures characteristic of the process of my British Specification 212,864.

The working up of the alkali-soluble ethyl derivatives of cellulose prepared according to the present invention into shaped structures may be effected for example by coagulating their shaped solutions (if desired or expedient after drying them) by means of any precipitating bath (or combination of two or more precipitating baths) known from the viscose art, or even by means of solutions of neutral inorganic or organic salts (for example sodium chloride or sodium sulphate or magnesium sulphate or sodium acetate or sodium oxalate or the like) or a mixture of one or more neutral salts or by means of organic acids (such as acetic acid or oxalic acid or even tannic acid or the like) or by means of weak inorganic acids (such as carbonic acid or boric acid) or by means of an alcohol or of formaldehyde solution, etc.

In certain cases, particularly in cases in which a small amount of ethyl chloride is used or in which the temperature of the reaction between the alkali cellulose and the ethyl chloride is too low to ensure the production of an alkali-soluble derivative or in which the proportion of caustic alkali to water and/or to cellulose is very low, products are obtained which will not dissolve or will only partially dissolve in caustic alkali solution at room temperature and which cannot be dissolved or completely dissolved therein even by means of the process described in my British Specification No. 212,864. It is true that these cellulose derivatives or at least their constituents which are insoluble in caustic alkali at any temperature are per se unsuitable for technical purposes. Notwithstanding, they are capable of being converted into valuble xanthates according to the methods described below and illustrated by examples.

As stated above, the present invention consists in treating cellulose in the presence of alkali with ethyl chloride at a temperature below 70° C., for example at a temperature between 50 and 65° C. and, when the ethylation takes place in presence of not substantially less than 11.5 mols. of water per 1 mol. of caustic alkali preferably NaOH at a temperature below 80° C., for example at a temperature between 60 to 75° C.

Very good results are obtained when the ethylation is conducted at temperature below 80° C. in presence of not substantially less then 12.5 or 16 or 22 or 30 or 42 mols. of water per one mol. of caustic alkali preferably NaOH.

Instead of ethyl chloride, a mixture of ethyl chloride with a hydroxy-alkylating agent (for example ethylene chloro-hydrin or ethylene oxide) or a mixture of ethyl chloride with a halogen fatty acid can be used.

The incorporation of the alkali and (if water is desired in the alkali cellulose) water with the cellulose may be effected in a variety of ways of which the following few examples (to which the invention is not limited) are given:

(a) Cellulose is steeped in caustic alkali solution and the excess removed, if desired after storing, by pressing, centrifuging, suction, filtration, etc. until the residue has the desired alkali- and water-content.

(b) Cellulose is steeped in caustic alkali solution of a strength which, after removal of a certain part of the caustic alkali solution by pressing, centrifuging or the like, will allow the contemplated amount of the caustic alkali to remain with the cellulose, but which will leave in the cellulose an amount of water which is larger than intended. This excess of water is thereafter driven off by drying at atmospheric or reduced pressure at room temperature or below room temperature or at a raised temperature (for example 60° C.) or by distillation with benzol or the like until only the desired quantity of water remains.

(c) Cellulose is impregnated or mixed with so much caustic alkali solution of appropriate strength as to yield an alkali cellulose which from the beginning contains the desired amounts of caustic alkali and water.

(d) Cellulose is mixed with so much solid caustic alkali or a mixture of solid caustic alkali and saturated caustic alkali solution as will leave in, or with, the cellulose the contemplated amount of caustic alkali but no water or less water than intended. The missing amount of water is added during or after the mixing operation or the mixture is permitted to absorb the desired quantity of water during or after the mixing operation.

Wherever the context permits, the products obtainable by the methods (a) to (d) will be called in this specification "alkali cellulose."

The alkali cellulose may be caused to react with ethyl chloride in its fresh state or after having matured for a shorter (say 12 to 24 hours) or a longer time (say 36 to 144 hours or more). The maturing of the alkali cellulose may be considerably accelerated by effecting it at a temperature above room temperature, for example at 24 to 40° C.

The ethylation may be effected in one or more stages, i. e. either by treating the alkali cellulose with the contemplated whole amount of ethyl chloride, or by starting the ethylation with a part of the contemplated quantity of ethyl chloride and acting upon the thus obtained product with a further amount or further amounts of ethyl chloride until the contemplated full amount has been used. In case of conducting the ethylation in two or several stages, also the caustic alkali or caustic alkali solution may be added in several portions according to the number of the stages of ethylation. As stated above, according to the present invention, either simple or mixed cellulose derivatives can be produced. As mixed derivatives the following may be named by way of example:

Cellulose derivatives containing in their molecule an ethyl group and another alkyl group, such as a methyl or propyl or an aralkyl group, e. g. benzyl group, cellulose derivatives containing in their molecule an ethyl group and a hydroxy-alkyl group, cellulose derivatives containing in their molecule an ethyl group and a hydroxy-acid residue.

These mixed derivatives can be obtained, for example, by treating the alkali cellulose in question simultaneously or in either order with ethyl chloride and an alkylating agent containing another alkyl group or with ethyl chloride and an aralkyl chloride, or with ethyl chloride and a hydroxy-alkylating agent, such as a chlorohydrin, or alkylene oxide, or with an ethyl chloride and a halogen fatty acid, etc. In case of simultaneous treatment, the ethyl chloride and the other etherifying agent may be added to the alkali cellulose together, for example mixed, or one after the other in either order.

The amounts of ethyl chloride employed in the present process may vary within wide limits.

The ethyl chloride may be employed in the undiluted state or diluted with a suitable diluent (for example benzol or chlorbenzol or ethyl ether or the like).

The treatment of the cellulose with alkali and with ethyl chloride may be carried out simultaneously, or successively in either order.

The reaction may also be conducted in presence of a catalyzer, such as a small quantity of a copper salt or nickel salt or iron salt or a peroxide, such as benzoyl peroxide.

In order to work up the reaction mixture after the reaction is completed, the reaction mixture is either dissolved as such by the addition of water (when unused alkali is present in sufficient quantity), or of a solution of caustic alkali of appropriate strength, and is put to the technical use contemplated, if necessary after previously filtering, straining through cloth or centrifuging, or the final product is isolated, for example by merely washing the reaction mass with water or another solvent for alkalies and salts (for instance aqueous alcohol). The washing may also be preceded by neutralisation of the alkali present in the reaction mass, or by acidification of the reaction mass.

The washed product of the reaction may then be either directly dissolved in caustic alkali solution and the solution worked up into some or another shaped structure, or dried and thereafter dissolved in caustic alkali solution and the solution worked up into a shaped structure.

It is self-evident from the above, that, regardless of whether the crude, i. e. unwashed reaction mass or the washed product of the reaction or the washed and dried product of the reaction is brought into solution in caustic alkali solution, in the event of the product being incapable of directly dissolving in caustic alkali solution at room temperature, the dissolving may be effected according to the process described in my British specification 212,864, i. e. by cooling the partial solution or suspension of the crude or washed product in caustic alkali solution to a temperature between plus 5° C. and 0° C. (if the product will sufficiently readily dissolve at a temperature lying between these two boundaries) or to a temperature below 0° C., for example to minus 5 or minus 10° C. or lower (if the product will not dissolve or completely dissolve at any temperature between room temperature and 0° C.), and thereafter allowing the temperature to rise to 0° C. or to a temperature between 0° C. and room temperature or to room temperature.

If the unwashed or washed product of the reaction will completely dissolve directly in caustic alkali solution at room temperature, it may be dissolved at room temperature or, if desired, according to the process described in my British specification 212,864.

In all cases in which the product of the reaction will incompletely dissolve in caustic alkali solution at room temperature, its part which will so dissolve may be isolated, i. e. separated from the part that will not so dissolve, for example in the following manner: The crude or washed reaction mass is partly dissolved by the addition of caustic alkali solution or of water (if enough alkali is present to dissolve the reaction product) the solution is freed from the undissolved constituents by filtering, straining, centrifuging or the like, and then mixed with an acid, an acid salt or neutral salt or any other substance capable of precipitating the part of the product of the reaction which is thus dissolved in the caustic alkali solution. The thus obtained precipitate is thoroughly washed and, if desired, dried. The drying may also be preceded by a dehydration with alcohol. As a matter of course, the constituents which did not dissolve in caustic alkali solution at room temperature and which have been separated from the constituents that did dissolve in caustic alkali solution at room temperature may be dissolved in caustic alkali solution according to the process of my British specification No. 212,864.

The conversion of the cellulose derivatives prepared according to the present invention into shaped structures, for example artificial threads, film, coatings of any kind and the like, is effected, for example, by bringing a solution of an ethyl derivative of cellulose made in accordance with the invention, into the desired shape and acting upon the thus shaped solution with a coagulating agent, for example one of the coagulating baths set forth above.

The ethyl derivatives of cellulose produced according to the present invention may be worked up into shaped structures also in such a manner that their shaped solutions are contacted with an agent or agents which has or have a coagulating effect on the shaped solution and a plasticising effect on the freshly coagulated material. As coagulating and plasticising agents, baths containing at least 25 per cent. of sulphuric acid monohydrate (of example 25 to about 70 per cent. of sulphuric acid monohydrate), or such a proportion of another strong mineral acid as will produce an effect in the manufacture of shaped structures similar to that given by sulphuric acid containing at least 25 per cent. of sulphuric acid, have proved suitable. The coagulating and plasticising of the shaped solution may also be performed in two steps by acting upon the shaped solution first with one or more agents which have a coagulating but no plasticizing or only little plasticizing effect on the shaped solution and then with one or more agents (for example strong mineral acids, particularly strong sulphuric acid) which have a plasticising effect on the freshly coagulated material.

As far as supportless artificial structures, such as artificial threads, artificial hair, artificial straw, film, bands, strips or the like are concerned, the shaping and coagulating may be effected by extruding the solutions of the ethyl derivatives of cellulose or the solutions of the xanthates of the ethyl derivatives through suitably formed openings into a coagulating bath. In case of such shaped structures as are combined with a rigid or pliable support, such as coatings, layers and impregnations of any kind, dressing of fabrics, textile printing, book-cloth, tracing cloth, sizing of yarn, paper-sizing, paper-like surfacing, etc. the shaping and coagulating may be accomplished by wholly or partially coating, impregnating, printing or otherwise covering or imbuing with the solution of the ethyl derivative of cellulose or the solution of the xanthate of the ethyl derivative of cellulose a rigid or pliable support, and, with or without intermediate drying, treating the material with a coagulating bath by either introducing the material into a coagulating bath or conducting the material through a mist of the coagulating bath or by any other method of applying a liquid to a rigid or pliable support.

As mentioned above, the ethyl derivatives of cellulose prepared according to the present invention can, by any process or method known in the cellulose chemistry, be converted into various derivatives, such as esters of inorganic or organic aliphatic or aromatic acids, for example nitrates, phosphates, formates, acetates, propionates, benzoates or into sulphonated derivatives or derivatives containing nitrogen, such as nitriles or cyanogen or cyanuric derivatives.

The conversion of the cellulose derivatives produced according to the present invention into water-soluble cellulose ethers or such cellulose ethers as are insoluble in water, but soluble in organic solvents can be effected by treating the ethyl derivatives of cellulose either in the dissolved state or in the solid state with further amounts of caustic alkali and etherifying agents, for example according to the processes and methods described in my U. S. Patents Nos. 1,188,376, 1,483,738 and 1,589,607 or by any other process or method for making from cellulose derivatives of low alkylating degrees water-soluble cellulose ethers or cellulose ethers which are soluble in volatile organic solvents only.

The xanthates of the ethyl derivatives of cellulose made according to the present invention are products of technical interest. For, the shaped structures, for example film, threads, coatings of any kind, finishings of textiles etc. produced therefrom have unusually valuable properties.

The xanthates of the ethyl derivatives of cellulose made according to the present invention can be produced by acting on the cellulose derivatives in the presence of alkali with carbon bisulphide. The carbon bisulphide may be caused to act either upon the ethyl derivatives of cellulose in the solid form in the presence of caustic alkali solution, for example upon a moist alkali compound of an ethyl derivative of cellulose or upon a mixture of an ethyl derivative of cellulose with caustic alkali solution or upon a suspension of an ethyl derivative of cellulose in caustic alkali solution or upon a solution of an ethyl derivative of cellulose in caustic alkali solution, which solution, as the case may be, can be prepared at room temperature or according to the process described in my British specification No. 212,864.

The conversion of the ethyl cellulose produced according to the present invention into their xanthates may be carried out in various ways. Some of these methods are described in the following lines by way of examples to which, however, the present invention is not limited. Since, in many cases, the combination of the preparation of the parent ethyl cellulose to be xanthated with the xanthating into a continuous operation or into a sequence of operations, presents some advantages, also some examples for the preparation of the starting ethyl celluloses are included in the following description.

*First method*

An ethyl cellulose prepared according to the present invention is, according to any of the methods known in the viscose art for the production of alkali cellulose, converted into its alkali compound, the alkali compound treated with carbon bisulphide at room temperature or at a temperature between room temperature and 0° C. or at 0° C. or at a temperature below 0° C., the thus obtained xanthate dissolved in water or in a caustic alkali solution at room temperature or at a temperature between room temperature and 0° C. or at 0° C. or at a temperature below 0° C. and thereafter put to technical use.

Second method

An ethyl cellulose prepared according to the present invention is dissolved in caustic alkali solution (according to its solubility relationships either at room temperature or at a temperature between room temperature and 0° C. or at 0° C. or at a temperature below 0° C.) or suspended therein, whereupon the thus obtained solution or suspension is treated with carbon bisulphide at room temperature or at a temperature between room temperature and 0° C. or at 0° C. or at a temperature below 0° C.

Third method

Cellulose in presence of caustic alkali (for example in the form of an alkali cellulose) is acted upon with ethyl chloride at one of the temperatures characteristic of the present invention, whereupon the resultant reaction mass is washed and thereafter treated with caustic alkali in the form of caustic alkali solution or of solid caustic alkali or of a mixture of solid caustic alkali and caustic alkali solution and with carbon bisulphide, the latter being added either simultaneously with the caustic alkali or after a shorter or longer period of time calculated from the contacting of the washed reaction mass with the caustic alkali. The treatment with the carbon bisulphide and/or the dissolving of the final xanthate in water or caustic alkali solution may be conducted at room temperature or at a temperature between room temperature and 0° or at 0° C. or at a temperature below 0° C.

Fourth method

Cellulose is acted upon in presence of caustic alkali, (for example in the form of an alkali cellulose) with ethyl chloride at one of the temperatures characteristic of the present invention, the resultant reaction mass, without being washed, is exposed to the action of a further quantity of caustic alkali in the form of caustic alkali solution or of solid caustic alkali or of a mixture of caustic alkali solution and solid caustic alkali and finally contacted with carbon bisulphide which is added either simultaneously with the caustic alkali or after a shorter or longer period of time calculated from the contacting of the unwashed reaction mass with the caustic alkali. The treatment with the carbon bisulphide and/or the dissolving of the final xanthate in water or caustic alkali solution may be conducted at room temperature or at a temperature between room temperature and 0° C. or at 0° C. or at a temperature below 0° C.

Fifth method

Cellulose is acted upon in presence of caustic alkali, (for example in the form of an alkali cellulose) with ethyl chloride at one of the temperatures characteristic of the present invention and the resultant reaction mass, without being washed and without being supplied with a fresh amount of caustic alkali, optionally after having matured for a longer or shorter time, treated with carbon bisulphide. The treatment with the carbon bisulphide and/or the dissolving of the final xanthate in water or caustic alkali solution may be conducted at room temperature or at a temperature between room temperature and 0° C. or at 0° C. or at a temperature below 0° C.

Sixth method

Cellulose is acted upon in presence of caustic alkali, (for example in the form of an alkali cellulose) with ethyl chloride at one of the temperatures characteristic of the present invention, whereupon the resultant reaction mass is washed and (if desired after being dried) brought into contact with a caustic alkali solution of such strength that the quantity added to the washed product of the reaction together with the water, (if any) contained therein will bring about such proportion of water, caustic alkali and ethyl cellulose produced according to the present invention as is desired in the solution or paste intended for technical use. Thereafter, the solution or paste or suspension which may or may not be cooled down to a temperature between room temperature and 0° C. or to 0° C. or to a temperature below 0° C., is acted upon with carbon bisulphide, the reaction with carbon bisulphide being conducted either at room temperature or at a temperature between room temperature and 0° C. or at 0° C. or at a temperature below 0° C.

Seventh method

Mode of procedure as in the sixth method, but with the difference that, before being contacted with the caustic alkali solution, the resultant reaction mass is not washed. As a matter of course, in this case the amount of caustic alkali (if any) contained in the reaction mass, is to be taken into account when the strength of the caustic alkali solution is calculated.

The foregoing methods are applicable to such ethyl celluloses produced according to the present invention as are soluble or only partially soluble or insoluble in caustic alkali solution, whilst the following method is only suitable for such ethyl celluloses produced according to the present invention as are soluble in caustic alkali solution.

Eighth method

Cellulose is acted upon in presence of caustic alkali (for example in the form of an alkali cellulose) with ethyl chloride at one of the temperatures characteristic of the present invention and the product of the reaction isolated from the reaction mass by dissolving the latter, if desired after washing, in dilute caustic alkali solution at room temperature or at a temperature between room temperature and 0° C. or at 0° C. or at a temperature below 0° C., if necessary freeing the thus obtained solution from undissolved particles by filtration, centrifuging, settling and decanting or the like and precipitating the dissolved ethyl cellulose by means of an acid substance or by means of a salt or a dehydrating agent, such as alcohol or by means of any other suitable precipitating agent. The so isolated ethyl cellulose is (if desired after being washed and, if desired dried) thereafter redissolved in caustic alkali solution and subjected to the action of carbon bisulphide.

It is desired to state expressly that it is not intended to limit the invention to the foregoing methods of carrying it out, and, in addition, that the xanthates of the alkali-soluble or alkali-insoluble ethyl celluloses produced according to the present invention may be prepared according to any process or method available for this purpose.

After the treatment with carbon bisulphide the final xanthates may be purified or isolated from the reaction masses, for example, by (optionally after neutralising them with a weak acid, for example acetic acid) precipitating with an alcohol, such as methyl- or ethyl alcohol, or with a solution of a salt, such as sodium chloride or an ammonium salt or the like or with carbon dioxide or with sulphurous acid or with sodium bisulphite; or be purified by dialysis.

In many cases, however, purification or isolation is unnecessary, since the crude reaction masses are readily soluble in caustic alkali solution and yield solutions that contain little or no undissolved particles.

The xanthates of the ethyl celluloses produced according to the present invention are readily soluble in caustic alkali solution and water. On being acidified, they yield coagulates or precipitates which are insoluble in water. With salts of heavy metals, for instance zinc or copper, they yield salts of such metals.

It is further remarkable that, in contrast to cellulose itself, the xanthate reaction takes place easily in presence of dilute alkali solutions.

The xanthates of the ethyl celluloses prepared according to the present invention may be worked up into artificial materials, for instance threads or film or coatings or layers of any kind or impregnations of any kind alone or in conjunction with other colloids, such as cellulose xanthate. Such combination with cellulose xanthate may be effected by mixing a solution of a xanthate of an ethyl cellulose prepared according to the present invention with viscose, or by dissolving a cellulose xanthate (sulphidised alkali cellulose) in a solution of a xanthate of an ethyl cellulose produced according to the present invention or by dissolving a xanthate of an ethyl cellulose made according to the present invention in viscose, or by conducting the xanthation so, that the carbon bisulphide is allowed to act in presence of caustic alkali upon a mixture of an ethyl cellulose produced according to the present invention and cellulose, for example by treating cellulose in presence of caustic alkali with an ethylating agent at one of the temperatures characteristic of the present invention under such conditions that only part of the cellulose contained in the alkali cellulose is converted into an ethyl cellulose and thereafter, by acting upon with carbon bisulphide, converting the thus obtained reaction mass into a mixture of a xanthate of an ethyl cellulose with cellulose xanthate. Also other alkali-soluble derivatives of cellulose or alkali-soluble cellulose hydrates or proteins or gelatine may be used as admixtures with the xanthates of the ethyl celluloses produced according to the present invention.

Any suitable softening agents, such as glycerine or a glycol or a sugar, such as glucose or a soap or Turkey-red oil, or a drying or a non-drying oil, or a halogen derivative or a di- or polyvalent alcohol, particularly a halohydrin, such as a dichlorohydrin or a monochlorohydrin or ethylene chlorohydrin may be added to the solutions of the xanthates of the ethyl cellulose produced according to the present invention.

With regard to the carrying out of the present invention in practice, it is impossible to indicate every condition for success in every particular case and it is to be understood that preliminary experiments cannot be avoided to find what are the conditions necessary for success when using a particular kind of cellulose, a particular method of incorporation the alkali with the cellulose and a particular ethylating agent.

In order to explain the nature of the present invention, the following specific examples are set forth. It is to be understood that the invention is not limited to these examples, to the precise proportions of ingredients, the times and temperatures and sequence of steps set forth; the parts are by weight.

*Example I A to K*

A. 1000 parts of air-dry cotton linters or woodpulp are steeped in 10,000 to 20,000 parts of caustic soda solution of 18 per cent. strength at 15 to 20° C. and the mixture allowed to stand at 15 to 20° C. for 1 to 24 hours. The resulting mass is then pressed to 3000 to 3400 parts and comminuted at 10 to 18° C. for 2 to 3 hours in a Werner-Pfleiderer shredder or another suitable comminuting machine. Thereupon the thus obtained alkali cellulose, either in the fresh state or after having matured at 18 to 20° C. for 12 hours, is placed in a rotating autoclave or an autoclave with a stirring device, 100 to 200 parts of pre-cooled ethyl chloride are added, and the material is heated to 50° C. and kept at this temperature for 12 to 24 hours.

The product of the reaction contained in the thus obtained reaction mass can be brought into solution in various ways, the more important being the following:

(a) The crude reaction mass is, without being washed or otherwise treated, mixed with such quantity of a caustic soda solution of appropriate strength as to yield a solution or suspension containing about 4 to 8 per cent. of the product of the reaction and 6 to 10 per cent. of caustic soda.

The product of the reaction is brought into solution in 6 to 9 per cent. caustic soda solution, for example at 0 to 5° C., or according to the process described in my British specification No. 212,864, i. e. by cooling to a temperature below 0° C., for example to a temperature of about minus 5 to minus 10° C. a mixture of the product of the reaction and caustic soda solution of 6 to 9 per cent. strength (which mixture, according to the strength of the caustic soda solution and/or the quantity of the etherifying agent used and/or the amount of salt contained in the reaction mass and/or the time of the reaction and/or the time of having been in contact with the caustic soda solution may be a suspension of the undissolved products of the reaction in the caustic soda solution or a suspension of the undissolved constituents of the product of the reaction in the solution of its dissolved constituents or a solution containing only a small amount of undissolved fibres) and, optionally after having kept the frozen or partially frozen mass at this temperature for some time, bringing it back to room temperature. Or (b) the crude reaction mixture as such or after having been neutralised or acidified is washed with water and then preferably pressed and either stored or (preferably, after the water content of the pressed product has been determined) directly mixed with so much caustic soda solution of appropriate strength as to yield a suspension or solution containing about 4 to 8 per cent. of the product of the reaction and 6 to 10 per cent. of caustic soda. Also, in this case, if necessary, the complete solution may be brought about by cooling the mixture to a temperature between room temperature and 0° C. or to 0° C. or to a temperature below 0° C., for example to a temperature of about minus 5 to minus 10° C., and bringing the solution back to room temperature or to any temperature between 0° C. and room temperature.

The washed and, preferably, pressed reaction mass may also be dried and then dissolved as described above.

(c). The product of the reaction may also be purified, for example in the following manner: It is brought into a very dilute (for example 1 to 2 per cent.) solution in caustic soda solution of 6 to 10 per cent. strength, for example either by dissolving it direct in caustic soda solution of such strength according to the process described in my British specification 212,864, i. e. by refrigerating and thawing, or by diluting the solution obtained according to the method described above under (a) or the method described above under (b). The thus obtained dilute solution is now, if necessary after being freed from any undissolved particles by filtration or the like, precipitated by means of an acid (for example sulphuric acid or hydrochloric acid or acetic acid) or by a salt, such as sodium chloride or sodium sulphate or the like.

The precipitate thus obtained is separated from the mother liquor and either directly dissolved in 6 to 10 per cent. caustic soda solution at room temperature or at a temperature between 0° C. and room temperature or at a temperature below 0° C., or, if desired after being previously dehydrated with alcohol and, if desired exhausted with ether, dried and thereafter dissolved.

The solutions obtained according to the methods (a) to (c) may be, if necessary after being filtered, converted into various shaped structures, the production of a few shaped structures being illustrated by way of the following examples to which the invention is not limited, since they are far from covering all kinds of shaped structures producible from the solutions of the products of the present invention.

(1) The solution is extruded through a suitable hopper or slit into a suitable precipitating or coagulating bath, for example any coagulating bath known from the viscose art, such as a 20 to 30 per cent. solution of ammonium sulphate or ammonium chloride or sodium chloride, or sulphuric acid of 10 to 20 per cent. strength, or a bath containing 10 to 16 per cent. of sulphuric acid and 20 to 25 per cent. of sodium sulphate, or a solution containing 10 to 16 per cent. of sodium sulphate, 14 to 30 per cent. of magnesium sulphate and 2 to 12 per cent. of sulphuric acid etc., etc.

To all the foregoing baths a certain quantity of an organic substance, for example 5 to 10 per cent. of glucose or glycerine and also some (for example 1 to 2 per cent.) zinc sulphate may be added.

The solution of the cellulose derivative may also be caused to enter a solution of a salt, for example a 25 per cent. solution of ammonium sulphate and being then conducted from the salt solution bath into an acid bath, for instance into any one of the acid baths set forth above by way of example.

The coagulating bath may be used at room temperature or below room temperature for example at 4 to 8° C. or at a raised temperature, for example at 35 to 45° C. or more.

The solidified film is washed with water and, optionally after having been contacted with a dilute solution of a substance having alkaline reaction, such as a dilute ammonia solution or a dilute solution of $Na_2CO_3$ or $NaHCO_3$ or the like and rewashed, dried in the usual manner.

The spinning into film and/or drying of the film may be conducted without any additional stretch or with more or less additional stretch.

The film may be treated before or after drying with an aqueous solution of glycerol (for instance of 4 to 10 per cent. strength), or glycol in order to increase its flexibility.

As a matter of course, the film may also be treated with any of the known moisture-proofing or water-proofing agents or compositions.

The film may be treated either in the course of its manufacture or in the finished state with a hardening agent, such as formaldehyde or the like.

The manufacture of narrow strips and artificial straw or bands follows automatically from the foregoing example.

(2) Making artificial threads: A solution prepared according to any one of the methods (a) to (c) is spun in known manner into any coagulating or precipitating bath known in the viscose art, for example into one of the precipitating or coagulating baths or combinations of two baths referred to in (1).

The solidified thread is thoroughly washed with water and dried in the usual manner.

The spinning operation may be conducted with or without additional stretch which may be effected, for example, by introducing into the path which the thread travels from the spinning nozzle to the collecting device, such as bobbin or centrifuge, one or more brakes, such as godets or differential rollers, or glass or metal rods arranged angularly to each other or the like. Additional stretch can be given the thread also by a high speed of spinning, for example of 80 to 100 meters or more per minute.

The artificial threads may be treated either in the course of their manufacture or in the finished state with a hardening agent, such as formaldehyde or the like.

(3) A mixture of 50 parts of viscose (prepared in the usual manner and containing 6 to 10 per cent. by weight of cellulose) and 50 parts of a solution prepared according to any one of the methods (a) to (c) is spun into film or artificial threads as in (1) or (2).

(4) The process is conducted as in (1) or (2) or (3), but with the difference that a bath is used which has a plasticising effect on the freshly coagulated material, for example sulphuric acid of 25 to 70 per cent. strength or another mineral acid, such as hydrochloric acid or phosphoric acid or nitric acid of a strength exerting a plasticising action on the freshly coagulating film or thread, equivalent to the plasticising action of sulphuric acid of 25 to 70 per cent. strength, or a strong zinc chloride solution free from or containing some hydrochloric acid or one of the plasticising baths referred to in my British Patent 357,549 or the like.

The plasticising may be effected by means of one bath or of two baths. In other words: The solution may be extruded directly into a bath which has a coagulating effect on the shaped solution and a plasticising effect on the freshly coagulated film or thread (for example one of the plasticising baths set out above) or it may be extruded into a bath which has no or only little plasticising effect on the shaped solution (such as one of the baths set out in (1) or (2)) and conducted from there into a plasticising bath (for instance one of the plasticising baths set forth above).

As a matter of course, also such film or threads as have a reduced lustre or are entirely dull can by any method known from the artificial silk art, be produced from the solutions obtained according to any of the methods (a) to (c). The same holds good with threads within which gas bubbles or hollow spaces are distributed.

Examples for the manufacture of staple fibre follow automatically from the foregoing.

(5) A woven fabric, such as a cotton fabric is provided by means of a suitable machine, such as a back-filling machine or a padding machine or a spreading machine, with one or more coatings of a solution prepared by any one of the methods (a) to (c), to which solution a filling material such as talc or china clay or zinc white or a dyestuff or pigment, such as a lake or lampblack or ocher or mica and/or a softening agent, for instance an oxy-trimethylene-sulphide—see my U. S. Patent 1,018,329—or a soap or Turkey-red oil or a drying or a non-drying oil etc. etc. may be added. The coated or impregnated or filled material is then introduced directly or after intermediate drying and/or steaming, into a precipitating bath as referred to in (1) or (4) and is then washed and dried.

The textile material may be treated before or after drying with a softening agent, such as a soap or Turkey-red oil or glycerol or the like.

(6) The procedure is as in (5), but with the exception that the solution is mixed with a solution of starch or dextrin or any other colloid known in the finishing art.

(7) The process is conducted as in (5) or (6), but with the exception that measures are taken towards incorporating with the final material deposited in or on the fibres of the fabric gas bubbles or hollow spaces. This may be done in any known manner either by dispersing or otherwise distributing a gas, such as air or hydrogen or nitrogen or the like, in the solution, or by introducing into the solution a substance (for example sodium carbonate or sodium sulphide) which in the subsequent coagulating or precipitating step will evolve a gas.

(8) The process is conducted as in (5) to (7), but with the difference that, before being applied to the fabric, the solution is converted into a lather according to the process described in my U. S. patent application Ser. No. 618,804, and in the corresponding British Patent 390,517.

Examples for sizing yarn follow automatically from Examples 5 to 8.

(9) A solution prepared by any one of the methods (a) to (c) is mixed with a dye-stuff or with a pigment, such as a lake or ocher or lampblack or zinc white or finely divided mica or a bronze powder free from aluminium and then printed in a rouleaux printing machine or stencilled on a cotton fabric. After being printed, the cotton fabric is, if desired after being dried, introduced into one of the non-plasticising or plasticising baths or combinations of baths set forth under (1) and (4) and, after having been run through the bath or the baths, washed and dried.

(10) A solution prepared according to any one of the methods (a) to (c) may be used also for the pasting together of two or more sheets of paper or card boards or of cotton fabrics, the materials pasted together being then, if desired after intermediate drying, introduced into one of the non-plasticising or plasticising baths or combinations of baths set out above under (1) and (4).

(11) Thick plates can be made by accordingly shaping concentrated solutions or pastes of the products of the reaction and, optionally after intermediate drying, treating them with one of the precipitating baths or combinations of precipitating baths set out above under (1) and (4).

As stated above, regardless of whether or not they are soluble or incompletely soluble or insoluble in caustic alkali solution at any temperature (temperatures below 0° C. included) the cellulose derivatives produced according to the present process when treated with carbon bisulphide in presence of alkali yield xanthates convertible into shaped structures which, even when produced by means of non- or only little plasticising baths are characterised by unusually excellent dynamometric properties.

In the following lines a few examples are given for the manufacture of xanthates from the products of the present example which, of course, do not exhaust the full range of methods coming into consideration.

X(1). The washed and pressed reaction mass resulting from the treatment of the alkali cellulose with the ethyl chloride is, in a suitable machine, for example in a Werner-Pfleiderer xanthating machine whose blades may be dentated or a kneading machine or a shredder or a rotating drum or the like, at 15 to 16° C. well mixed with such an amount of caustic soda and water as, together with the amount of water present in the mass, to contain 10,000 to 20,000 parts of caustic soda solution of 18 per cent. strength.

After having stood at room temperature or thereabouts for 1 to 3 hours, the mass is pressed to 3400 to 4200 parts and then comminuted in a shredder or another suitable comminuting machine for 2 to 3 hours at 11 to 15° C. After shredding 300 to 400 parts of carbon bisulphide are added and the reaction mass treated therewith under kneading or shredding or stirring or otherwise agitating (for instance in a rotating drum) for 3 to 10 hours. The xanthated mass is dissolved in so much water and caustic soda as to yield a solution containing about 6 to 9 per cent. of the dry residue of the washed and pressed mass and 6 to 9 per cent. of caustic soda.

After having been aged at 15 to 18° C. for 48 or 72 or 80 or 100 hours and, during this time, filtered, the solution may be worked up into artificial threads or staple fibre or film or strips or artificial hair according to any one of the methods described above under (1) to (4).

The solution may be further used for the dressing or coating or impregnating or printing of fabrics or sizing of yarn according to any one of the methods described above under (5) to (9).

Also a more concentrated solution or paste of the xanthates (for example a 15 per cent. solution in a caustic alkali solution of 7 to 10 per cent. strength) may be prepared, such solution being suitable for making thick plates or adhesives or the like in the manner set out above under (10) and (11).

X(2). The process is conducted as in X(1), but with the difference that, before being dissolved, or at any other stage of the xanthating operation, the reaction mass is cooled down to a temperature between room temperature and 0° C. or to 0° C. or to a temperature below 0° C., for example to minus 5 or minus 10° C. and kept at that temperature with stirring or kneading or otherwise agitating for 20 minutes to 2 hours or longer.

X(3). Mode of procedure as in X(1) or X(2), but with the exception that the dissolving of the xanthated mass in caustic alkali solution is conducted in such a manner that at any stage of the dissolving step, for example at the end of the dissolving step, the complete or incomplete solution is, with stirring or kneading or otherwise agitating, cooled down to a temperature between room temperature and 0° C. or to 0° C. or to a temperature below 0° C., for instance to minus 5 or minus 10° C. and thereafter brought back to room temperature or to a temperature between 0° C. and room temperature.

X(4). The process is conducted as in any one of the Examples X(1) to X(3), but with the difference that the carbon bisulphide is added to the alkali compound of the cellulose derivative in two portions of 150 to 200 parts, the second portion being added after half of the full time of the xanthation has elapsed.

X(5). The process is conducted as in any one of the Examples X(1) to X(3), but with the difference that, instead of 300 to 400 parts, only 200 parts of carbon bisulphide are used, the age of the xanthated solution at the time of working it up into a shaped structure being 24 to 60 hours.

X(6). The process is conducted as in any one of the Examples X(1) to X(3), but with the difference that, instead of 300 to 400 parts, 140 to 160 parts of carbon bisulphide are used, the age of the xanthate solution at the time of working it up into a shaped structure being 10 to 36 or 48 hours.

X(7). The process is conducted as in any one of the Examples X(1) to X(3), but with the exception that, instead of 300 to 400 parts, 50 to 100 parts of carbon bisulphide are added, the age of the xanthate solution at the time of working it up into a shaped structure being 8 to 30 or 42 hours.

X(8). The process is conducted as in any one of the Examples X(1) to X(7), but with the difference that, instead of being alkalised with an excess of caustic soda solution and then freed from the excess of the caustic soda solution by pressing, the washed and pressed reaction mass is in any suitable apparatus, for example a Werner-Pfleiderer xanthating machine or a Werner-Pfleiderer shredder or a Werner-Pfleiderer kneading machine, mixed with such an amount of caustic alkali solution of appropriate strength as to yield a mixture containing 1,000 parts of the dry residue of the washed and pressed reaction product and 1,000 to 2,400 parts of caustic soda solution of 18 per cent. strength, the xanthating of the thus obtained product and the bringing it into solution being conducted as in any one of the Examples X(1) to X(7).

X(9). The process is conducted as in any one of the Examples X(1) to X(7), but with the difference that, instead of being alkalised with an excess of caustic soda solution and then freed from the excess of the caustic soda solution by pressing, the washed and pressed reaction mass is in a suitable apparatus, for example a Werner-Pfleiderer xanthating machine or a Werner-Pfleiderer shredder or a Werner-Pfleiderer kneading machine, mixed with such an amount of caustic alkali solution of appropriate strength as to yield a mixture containing so much of the dry residue of the pressed and washed reaction product and caustic alkali solution of 18 per cent. strength as, after xanthation which is performed as described in any one of the Examples X(1) to X(7) and on addition of an appropriate quantity of water to yield a solution containing about 6 to 9 per cent. of the dry residue of the washed and pressed reaction product in caustic soda solution of 6 to 9 per cent. strength.

X(10). The process is conducted as in any one of the Examples X(1) to X(9), but with the exception that, the reaction mass resulting from the treatment of the alkali cellulose with the ethylchloride is, without being washed, alkalised with 6,600 to 13,600 parts of caustic soda solution of 18 per cent. strength at 15° C. and then, by pressing, shredding and sulphidising, worked up into the final xanthate as described in any one of the Examples X(1) to X(9) and the latter into any one of the shaped structures set out above under (1) to (11).

X(11). The crude reaction mass resulting from the treatment of the alkali cellulose with ethylchloride in which the proportion of caustic soda (which proportion has been determined by titration of the crude reaction mass), is brought (preferably by addition of an appropriate quantity of a strong caustic soda solution, for example of 50 per cent. strength) to such a proportion as, with the caustic soda and water present, to yield 2,000 to 2,500 parts of caustic soda solution of 18 per cent. strength is treated with 300 to 600 parts of carbon bisulphide and then worked up into a xanthate in the same manner as the washed and alkalised and pressed reaction mass is xanthated in any one of the Examples X(1) to X(9). The thus obtained solutions are then worked up into shaped structures according to any one of the methods described above under (1) to (11).

X(12). The reaction mass resulting from the treatment of the alkali cellulose with ethylchloride is in the crude state or in the washed and pressed state mixed with such an amount of caustic soda solution of appropriate strength as to yield a mixture of 1,000 parts of the cellulose derivative contained in the crude reaction mass or of the dry residue of the washed and pressed reaction mass and 15,666 to 11,500 parts of caustic soda solution of 6 to 9 per cent. strength. The mixture is now in a Werner-Pfleiderer xanthating machine or another appropriate machine stirred at room temperature or at any temperature between room temperature and 0° C. or at 0° C. or at a temperature below 0°C. for 20 minutes to 2 hours, whereupon 500 parts (i. e. 50 per cent. calculated on the weight of the cellulose derivative) of carbon bisulphide are added and the mixture kept with stirring or shaking or agitating for 3 to 10 hours at room temperature.

After having been aged at 15 to 18° C. for 90 to 110 hours and after, during ageing, having been filtered two to three times, the xanthate solution thus obtained is worked up into any one of the shaped structures set forth above under (1) to (11).

X(13). The process is conducted as in X(12), but with the difference that, after having been treated with carbon bisulphide at room temperature for 3 to 10 hours, the reaction mass is cooled down to a temperature between room temperature and 0° C. or to 0° C. or to a temperature below 0° C., for instance to minus 5 to minus 10°

C., kept at this temperature for 20 to 30 minutes or even 1 to 2 hours with stirring, kneading or otherwise agitating and then brought back to room temperature.

X(14). The reaction mass resulting from the treatment of the alkali cellulose with ethylchloride is in the crude state or in the washed and pressed state mixed with such an amount of caustic soda solution of appropriate strength as to yield a mixture of 1,000 parts of the cellulose derivative contained in the crude reaction mass or of the dry residue of the washed and pressed reaction mass and 15,666 to 11,500 parts of caustic soda solution of 6 to 9 per cent. strength. The mixture is now stirred at room temperature or at any temperature between room temperature and 0° C. or at 0° C. or at a temperature below 0° C. for 20 minutes to 2 hours, whereupon 300 parts of carbon bisulphide are added and the mixture kept with stirring or agitating for 3 to 10 hours at room temperature. After that time 200 parts of carbon bisulphide are added and the mixture kept at room temperature for 3 to 4 hours with stirring or agitating.

The age of the solution at the time of converting it into artificial threads or film or the like is 80 to 105 hours at 15 to 18° C.

X(15). The process is conducted as in X(14), but with the difference that after the first stage of the xanthation and after the second stage of the xanthation the mixture is cooled down to minus 5 to minus 10° C. and kept at this temperature for 30 minutes to 2 hours, whereupon the solution thus obtained is brought back to room temperature.

X(16). The process is conducted as in any one of the Examples X(12) to X(15), but with the the exception that, instead of 500 parts, only 350 parts (i. e. 35 per cent. calculated on the weight of the cellulose derivative) of carbon bisulphide are used.

In the event of the working condition X(14) or X(15) being used as basis, in the first stage the amount of carbon bisulphide is to be 200 parts and in the second stage 150 parts.

X(17). The process is conducted as in Example X(12) or X(13), but with the difference that, instead of 500 parts, only 200 parts of carbon bisulphide are used, the age of the final solution being 24 to 48 or 60 hours at 15 to 18° C.

X(18). The process is conducted as in Example X(12) or X(13), but with the difference that, instead of 500 parts, 140 to 160 parts of carbon bisulphide are employed, the age of the xanthate solution before converting it into shaped structures being 12 to 40 hours at 15 to 18° C.

X(19). The process is conducted as in Example X(12) or X(13), but with the difference that, instead of 500 parts, only 50 to 100 parts of carbon bisulphide are used and that the age of the solution before conversion into shaped structures is 10 to 36 hours at 15 to 18° C.

The desulphurisation or bleaching of the shaped structures, such as film, threads, etc. produced from the xanthates of the cellulose compounds made according to the present invention may be conducted in any manner known from the viscose art.

The shaped structures may also be desulphurised by any one of the processes described in my U. S. Patents Nos. 1,989,100, 2,004,875, 2,004,876 and 2,004,877.

The solutions of the xanthates described above are precipitable by means of ethyl or methyl alcohol, preferably under stirring. The thus obtained precipitates, when collected on a filter or a straining cloth or in a filter press or in a centrifuge, if desired washed with alcohol and, optionally, exhausted with ether and dried, are substances which are soluble in caustic alkali solution.

Prior to their conversion into their shaped structures any suitable softening agents, such as an oxytrimethylene-sulphide (see my U. S. Patent No. 1,018,329) or glycerine or a glycol or a sugar, such as glucose or a sulphonated oil, such as Turkey-red oil or a drying or non-drying oil or any other known plasticising or softening agent, for example the substances with which viscose is contacted in my U. S. Patents Nos. 2,021,862, 2,021,863, 2,021,864, 2,051,051 and 2,087,981, and in my British patent specifications 357,549 and 385,797, may be added to the solutions of the straight cellulose ethers or of their mixtures with cellulose xanthate or to the solutions of the xanthates of the cellulose derivatives produced according to the present invention.

B. The process is conducted as in A, but with the difference that, instead of 100 to 200 parts, 300 to 1,500 parts of ethyl chloride are used.

On being analized by the Zeisel method the products of the foregoing example give ethoxyl figures of about 1.3 to 1.6 per cent. This means that one ethyl group is bonded to about 17 to 20 $C_6H_{10}O_5$ molecular units of cellulose.

C. The process is conducted as in Example A, but with the difference that, instead of 100 to 200 parts of ethyl chloride, a mixture of 50 to 100 parts of ethyl chloride and 50 to 200 parts of ethylene chlorohydrin or 25 to 140 parts of ethylene oxide or propylene oxide or 100 to 200 parts of di-methyl sulphate or 100 to 200 parts of methyl chloride or 100 to 300 parts of benzyl chloride or of monochloroacetic acid (for example in the form of sodium monochloroacetate) is used.

D. The process is carried out as in A or B or C, but with the difference that the reaction is conducted at 60 to 65° C.

E. The process is carried out as in A or B or C or D, but with the difference that the duration of heating is only 3 to 8 hours.

F. The process is conducted as in any one of the Examples A to E, but with the difference that the alkali cellulose is allowed to mature for 24 to 96 hours or longer.

*Example II A to F*

The process is conducted as in any one of the Examples I A to F, but with the difference that, instead of 3000 to 3400 parts, the alkali cellulose is pressed to 2000 parts.

*Example III A to F*

The process is conducted as in any one of the Examples I A to F, but with the difference that, instead of the alkali cellulose used therein, an alkali cellulose is used that has been prepared by intimately mixing in a suitable mixing machine, such as a Werner-Pfleiderer shredder or a disintegrator or a mill or an edge runner 1000 parts of cotton linters or wood-pulp with 1000 to 2500 parts of caustic soda solution of 18 to 25 per cent. strength, the time of mixing being 1 to 12 hours and the temperature 5 to 25° C.

*Example IV A to G*

A. 1,000 parts of air-dry cotton linters or wood-pulp are steeped in 10,000 to 20,000 parts of caustic soda solution of 15 per cent. strength at 15 to 20 C. and mixture is allowed to stand at 15 to 20° C. for 1 to 24 hours. The resulting mass is then pressed to 3,000 to 3,400 parts and comminuted at 10 to 18 C. for 2 to 3 hours in a Werner-Pfleiderer shredder or another suitable comminuting machine. Thereupon the thus obtained alkali cellulose either in its fresh state or after having matured at 18 to 21° C. for 12 hours is placed in a rotating autoclave or an autoclave which is provided with a stirring device and 100 to 200 parts of pre-cooled ethyl chloride are added and the mass is heated to 50 C. and kept at this temperature for 12 to 24 hours.

The product of the reaction is brought into solution according to method (a) or (b) or (c) described in Example I A and the thus obtained solution worked up into shaped structures according to any one of the methods described in Example I A under (1) to (11).

The products of the reaction may be xanthated and the xanthates worked up into shaped structures according to any one of the methods set out in Example I A under X(1) to X(19).

B. The process is conducted as in Example A, but with the difference that, instead of 100 to 200 parts, 300 to 1,500 parts of ethyl chloride are used.

C. The process is conducted as in Example A, but with the difference that, instead of 100 to 200 parts of ethyl chloride, a mixture of 50 to 100 parts of ethyl chloride and 50 to 200 parts of ethylene chlorohydrin or 25 to 140 parts of ethylene oxide or propylene oxide or 100 to 200 parts of di-methyl sulphate or 100 to 200 parts of methyl chloride or 100 to 300 parts of benzyl chloride or of monochloroacetic acid (for example in the form of sodium monochloroacetate) is used.

D. The process is carried out as in any one of the Examples A or B or C, but with the difference that the reaction is conducted at 60 to 65° C.

E. The process is carried out as in any one of the Examples A or B or C, but with the exception that the reaction is conducted at 70 to 75 C.

F. The process is carried out as in any one of the Examples A to E, but with the difference that the duration of heating is only 3 to 8 hours.

G. The process is conducted as in any one of the Examples A to F, but with the exception that the alkali cellulose is allowed to mature for 24 to 96 hours.

*Example V A to G*

The process is conducted as in any one of the Examples IV A to G, but with the difference that, instead of 3,000 to 3,400 parts, the alkali cellulose is pressed to 2,000 parts.

*Example VI A to G*

The process is conducted as in one of the Examples IV A to G, or V A to G, but with the difference that, instead of the caustic soda solution of 15 per cent. strength, a caustic soda solution of 12 per cent. strength is used for the preparation of the alkali cellulose.

*Example VII A to G*

The process is conducted as in any one of the Examples IV A to G or V A to G, but with the difference that, instead of the caustic soda solution of 15 per cent. strength, a caustic soda solution of 9 per cent. strength is used for the preparation of the alkali cellulose.

*Example VIII A to G*

The process is conducted as in any one of the Examples IV A to G or V A to G, but with the difference that, instead of the caustic soda solution of 15 per cent. strength, a caustic soda solution of 5 per cent. strength is used for the preparation of the alkali cellulose. (A 5% NaOH solution contains about 42.2 mols. of water to 1 mol. of NaOH).

The products of Examples I to VIII may in the form of the crude reaction masses (when necessary with addition of some concentrated caustic alkali solution or solid caustic alkali in replacement of or in excess of the caustic alkali used up in the reaction) or in the form of the washed and, optionally dried, reaction mixture or in the purified form, be treated in the presence of alkali with 80 to 150 parts of propyl chloride or 100 to 600 parts of benzyl chloride at 50 to 110° C. and then worked up and used as such or in the form of its xanthate as described in Example I A.

Any one of the simple ethyl celluloses obtained in any one of the preceding examples may be hydroxy-alkylated in the following manner:

The NaOH content of the crude reaction mixture resulting from the methylating or ethylating operation in any one of the Examples I A and B and D to F to III A and B and D to F and IV A and B and D to G to VIII A and B and D to G is determined by analysis, whereupon, optionally after compensating the amount of NaOH used up in the ethylating reaction by supplying to the reaction mixture the equivalent or a larger quantity of NaOH in the form of powder or of a strong solution, for instance of 30 to 50 per cent. strength, the reaction mixture is treated in any known manner with 50 to 150 parts of ethylene chlorohydrin or with 70 to 210 parts of glycerol alpha-monochlorohydrin or with 25 to 75 parts of ethylene oxide or with 32 to 100 parts of propylene oxide at room temperature or at a temperature below room temperature, for example at 10° C. or at a raised temperature, for example at 50° C.

The thus obtained ethyl-hydroxy-ethyl cellulose or ethyl-1:2-dihydroxy-propyl cellulose or propyl cellulose is worked up and used as straight ether or ether xanthate as described in Example I.

Instead of being prepared by steeping the cellulose in an excess of caustic alkali solution and removing the excess by pressing, or in any one of the preceding examples, the alkali cellulose may also be prepared by mixing the cellulose in a suitable mixing apparatus, for example a shredder or a kneading machine or a mill or a disintegrator or an edge runner or the like with the amount of caustic soda solution corresponding with the quantity remaining in the alkali celluloses used in the relative examples after pressing. The mixing of the cellulose with the caustic alkali solution may be conducted at room temperature or at a temperature above room temperature, for example at 24 to 30° C., or with cooling, for example to 15 or 10° or lower. The time of mixing may be varied within wide limits, for example from 1 hour to 24 hours or longer.

In the foregoing examples, any excess of the etherifying agents which has not been used up in the reaction may be recovered by condensation or distillation.

The products of the foregoing examples are also soluble in the known solvents for cellulose, for instance such solvents as are enumerated in the seventh paragraph of the present specification.

In the foregoing examples, instead of cellulose, any conversion product of cellulose which is insoluble or only scarcely soluble in caustic alkali solution may be used as parent material —for instance, a cellulose hydrate or a hydrocellulose produced by chemical action on cellulose, such as mercerisation with subsequent washing and, if desired, drying; or by treating with a strong inorganic or organic acid or a mixture of both; or by heating with a dilute solution of a mineral acid; or by treatment with a zinc halide; or by a mechanical process, such as grinding in presence of water or the like; or an oxy-cellulose—in short any body of the cellulose group which has been proposed for the manufacture of viscose or of any other cellulose derivatives or compounds or of ammoniacal-copper-oxide-cellulose.

In the foregoing examples, a small amount of a catalyser, for example, of a metal salt, such as a copper salt, nickel salt, silver salt, zinc salt, iron salt, or a peroxide, for instance benzoyl peroxide or ammonia or primary, secondary or tertiary organic bases, such as a mono- or di-alkyl aniline or a mono-, di- or tri-alkyl amine or an aralkyl amine, or an oxy-alkyl amine or the like may be added to the alkali cellulose or reacting mixture.

If desired or expedient, in the foregoing examples, instead of the halogenated etherifying agents used therein, equivalent quantities of the corresponding brominated or iodinated reagents (for example alkyl bromides or alkyl iodides or monobromohydrin or monoiodohydrin or ethylene bromohydrin or ethylene iodohydrin or bromo-acetic acid or iodo-acetic acid) may be used.

If desired or expedient, in the foregoing examples, instead of the alkylating and hydroxy-alkylating agents used therein, equivalent quantities of alkylating or hydroxy-alkylating agents containing other alkyl or hydroxy-alkyl groups can be used, for instance methyl chloride or propyl chloride or an amyl chloride or a butyl chloride or propylene chlorohydrin or butylene chlorohydrin.

If desired or expedient, instead of ethylene oxide, other alkylene oxides, such as propylene oxide or butylene oxide, in short all suitable compounds which contain an ethylene oxide ring, and also other cyclic ethers, for example glycid, can be used in the foregoing examples.

If desired or expedient, instead of alkyl halides or di-alkyl sulphates, equimolecular amounts of their substitution or addition derivatives, for example halogen alkyl amines, such as halogen-alkyl-dialkyl amines or their hydrochlorides can be employed in the foregoing examples.

If desired or expedient, in the foregoing relative examples, instead of the chloroacetic acid, the equimolecular quantity of an ester of chloroacetic acid, for example methyl- or ethyl chloroacetate, or a halogen derivative of a homologue of acetic acid, for instance alpha-chloropropionic acid or alpha-chloro-isobutyric acid or alpha-bromo-propionic acid or alpha-bromo-isobutyric acid or the like or an alkali salt or an ester thereof may be employed.

If feasible or expedient, in the foregoing examples the coagulating or precipitating baths described in my British Patent 457,031 can be used in the working up of the products of the invention into shaped structures or other useful articles.

If desired, the extensibility of the shaped structures, such as threads or film or coatings or the like produced according to the present invention either from the straight cellulose compounds or from their xanthates may be increased by treating them either in the course of their manufacture, for example after coagulating and washing or in the finished wet or dry state with suitable shrinking agents, for example, with some of the shrinking agents mentioned in my U. S. Patents Nos. 1,989,098, 2,001,621, 1,989,101, 1,989,-100, 2,004,875 and 2,004,876.

As a guiding line with regard to the question whether or not the alkali cellulose should be allowed to mature before being brought together with the etherifying agent or agents may, among others, serve the desired viscosity of the xanthate solution of the straight cellulose derivative or of its xanthate which is to be worked up into shaped structures in general and artificial threads in particular, and in connection therewith the viscosity of the kind of cellulose contemplated. If it is desired to give the solution a definite viscosity, then the alkali cellulose produced from the kind of cellulose contemplated is subjected to a maturing process, if without maturing this kind of cellulose yields a higher viscosity. If, however, it exhibits from the first the desired grade of viscosity that is without maturing, the maturing is superfluous. Now, as the viscosities of the different kinds of cellulose on the market (linters and wood-pulp) differ very much from one another, the question of maturing depends in most cases on the one hand on the viscosity desired of the xanthate solution intended for the manufacture of shaped structures, and on the other hand on the viscosity of the kind of cellulose being worked.

Wherever the context permits, the expressions "alkali-soluble ethyl derivative of cellulose," "alkali-soluble ethyl cellulose," "ethyl derivative of cellulose which is soluble or at least partially soluble in caustic alkali solution," "ethyl cellulose which is soluble or at least partially soluble in caustic alkali solution," "ethyl derivative of cellulose which is at least partially soluble in caustic alkali solution" and "ethyl cellulose which is at least partially soluble in caustic alkali solution" are intended to include such simple ethyl ethers of cellulose and such mixed cellulose ethers in the molecule of which at least one hydroxyl hydrogen atom of the cellulose molecule is substituted by an ethyl group as are completely or almost completely soluble in caustic alkali solution at room temperature and at a lower temperature, for example at a temperature between room temperature and 0° C. or lower and such simple ethyl ethers of cellulose and such mixed cellulose ethers in the molecule of which at least one hydroxyl hydrogen atom of the cellulose molecule is substituted by an ethyl group as are insoluble or incompletely soluble in caustic alkali solution at room temperature, but as can be made soluble or completely soluble therein at room temperature by cooling their suspensions or incomplete solutions in caustic alkali solution to a temperature between room temperature and 0° C. or to 0° C. or to a temperature below 0° C., for example to minus 5° or to minus 10° C. or lower and then allowing the temperature to rise to 0° C. or above 0° C. and such simple ethyl ethers of cellulose and such mixed cellulose ethers in the molecule of which at least one hydroxyl hydrogen atom of the cellulose molecule is substituted by an ethyl group as are insoluble or incompletely soluble in caustic alkali solution at room temperature or at a temperature between room temperature and 0° C. or even at 0° C., but as can be made partially or completely soluble therein at room temperature and/or at a temperature between room temperature and 0° C. or at 0° C. by cooling their suspensions or incomplete solutions to a temperature below 0° C., for example to minus 5° C. or minus 10° C. or lower and then allowing the temperature to rise to 0° C. or above 0° C.

The term "cellulose" used in the description and claims is, wherever the context permits, intended to include cellulose, its conversion and oxidation products, such as cellulose hydrate, hydrocellulose, oxy-cellulose, acid-cellulose and the like, in short, any body of the cellulose group which has been proposed as starting material for the preparation of cellulose derivatives or cellulose compounds of any kind.

The term "alkali cellulose," wherever the context permits, means alkali cellulose prepared in the usual manner, namely by steeping cellulose in caustic alkali solution and removing the excess of the latter by pressing or by mixing cellulose with such an amount of caustic alkali solution as is desired to be present in the final alkali cellulose.

The expression "etherification" in the specification and claims cover alkylation or aralkylation or hydroxy-alkylation or production of hydroxy-acid derivatives, "ether" covers simple alkyl or aralkyl and hydroxy-alkyl, or hydroxy-acid ethers, and also mixed ethers for example the mixed ethers set forth on page 3, column 1, line 72 to column 2, line 9 "etherifying agents" covers alkylating and aralkylating and hydroxy-alkylating agents and halogen fatty acids.

The expression "halohydrin" used in the specification and the claims includes, wherever the context permits, the compounds containing both at least one halogen and at least one hydroxyl group which may be regarded as being derived from a di- or polyhydroxy alcohol by a partial exchange of the hydroxyl groups for chlorine, bromine or iodine (or from a mono- or polyhydroxy alcohol by the substitution of one or more hydrogen atoms in the alcohol radical), and the derivatives (such as the esters) or internal anhydrides (such as epichlorohydrin) of such halohydrins, or substances or mixtures of substances which are capable of yielding such halohydrins.

The term "hydroxy-alkyl" is intended to include the halogenated or non-halogenated radicals of di- or polyvalent alcohols in conjunction with one or more oxygens or hydroxyls.

Wherever the context permits, the term "alkyl," "alkylate," "alkylating agent," "alkylation" are intended to include unsubstituted or substituted (for example aralkyl groups) alkyl groups, alkylate with alkylating agents that contain unsubstituted or substituted (for example aralkyl groups) alkyl groups, alkylating agents that contain unsubstituted or substituted (for example aralkyl groups) alkyl groups, alkylation with alkylating agents that contain unsubstituted or substituted (for example aralkyl groups) alkyl groups.

The term "hydroxy-alkylating agents" is intended to include halogen derivatives of di- or polyhydric alcohol, particularly halohydrins, such as mono-halohydrin and alkylene oxides.

In the specification and claims the expression "halogen fatty acid" or "monohalogen fatty acid" includes, wherever the context permits, monochlor- monobrom- and monoiodo-fatty acids themselves, their derivatives (such as esters) and their salts, as well as substances and mixtures of substances which yield monohalogen fatty acids or their derivatives.

The expression "artificial structures" or "shaped structures" used in the specification and claims is intended to include: Artificial threads, particularly artificial silk and staple fibre, artificial hair, artificial straw, film of every kind, bands and plates of every kind, plastic masses of any description; adhesives and cements; finishes, coatings and layers of every kind, particularly such as are applicable in finishing, filling and dressing of textile fabrics, sizing of yarn, thickening agents or fixing agents for pigments in textile printing and the like; paper-like surfacing, paper-sizing; in the manufacture of artificial leather or of book-cloth or of tracing cloth or of transparent paper or of transparent cloth and the like.

The term "artificial threads" denotes artificial threads and spun goods of all kinds, for instance artificial silk, artificial cotton, artificial wool, artificial hair and artificial straw of any kind.

What I claim is:

1. A process of preparing a cellulose ethyl ether which comprises treating cellulose as herein defined, with ethyl chloride, at below 80° C., in the presence of a caustic alkali solution that contains between about 11.5 mols. and about 42.3 mols. of water per mol. of caustic alkali.

2. Ethyl ether of cellulose which contains not more than one ethyl group to 20 $C_6H_{10}O_5$-molecular units of cellulose.

3. Mixed ethers of cellulose containing an ethyl radical and another radical both linked ether fashion to cellulose, such ethers containing not more than one ethyl group to 20 $C_6H_{10}O_5$-molecular units of cellulose.

4. A shaped regenerated cellulosic structure which contains, as its characteristic constituent, an ether of cellulose which contains not more than one ethyl group to 20 $C_6H_{10}O_5$-molecular units of cellulose.

5. A solution, in caustic alkali solution of an ether of cellulose which contains not over one $C_2H_5$ group to about 20 $C_6H_{10}O_5$-molecular equivalents of cellulose.

6. A xanthate of an ether of cellulose which contains one $C_2H_5$ group to at least about 20 $C_6H_{10}O_5$-molecular units of cellulose, and which xanthate is soluble in caustic alkali solution.

7. A solution, in caustic alkali solution, of a xanthate of an ether of cellulose which contains not substantially less than 20 $C_6H_{10}O_5$-molecular units, per one ethyl radical.

LEON LILIENFELD.